Patented May 12, 1931

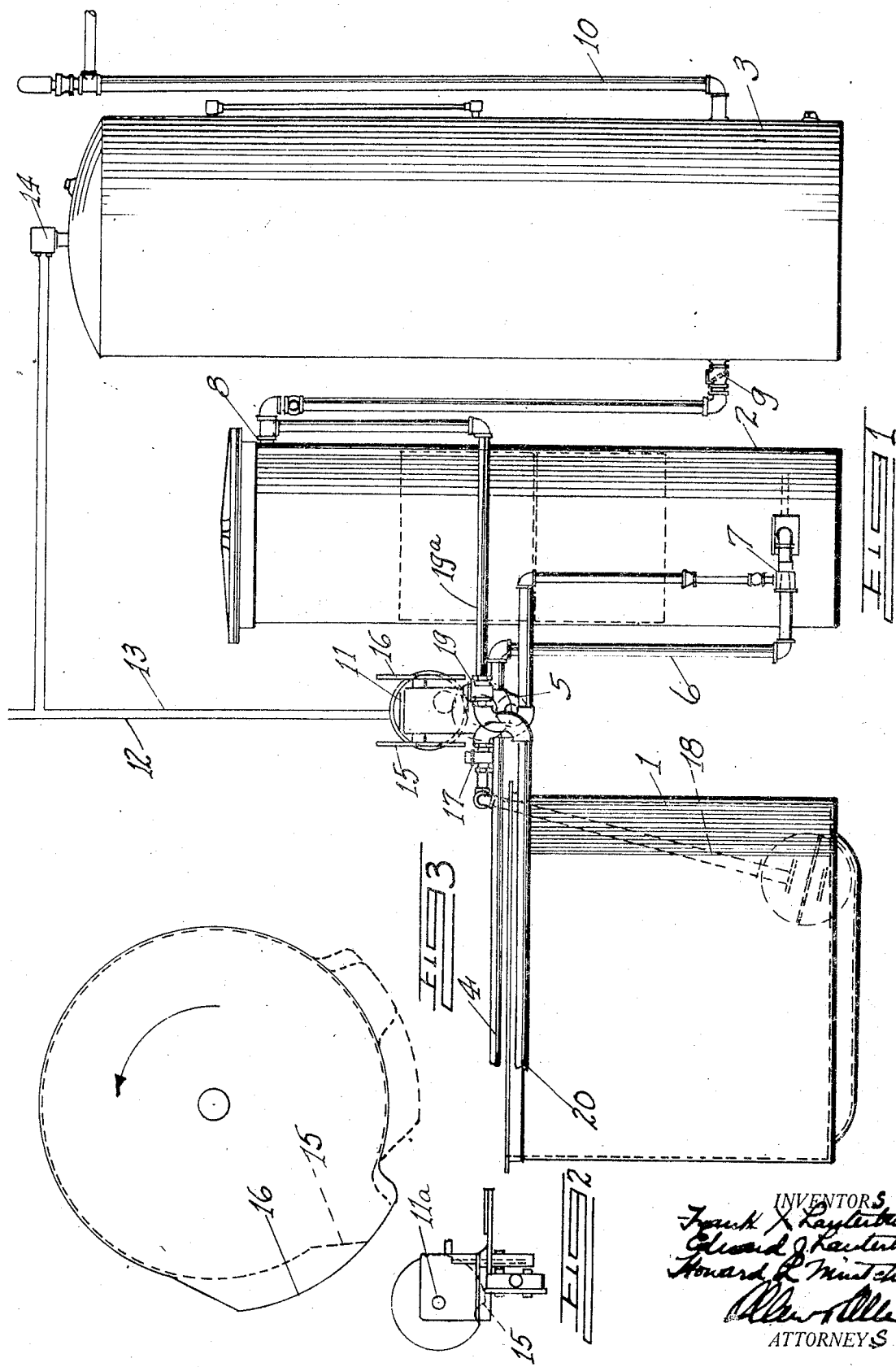

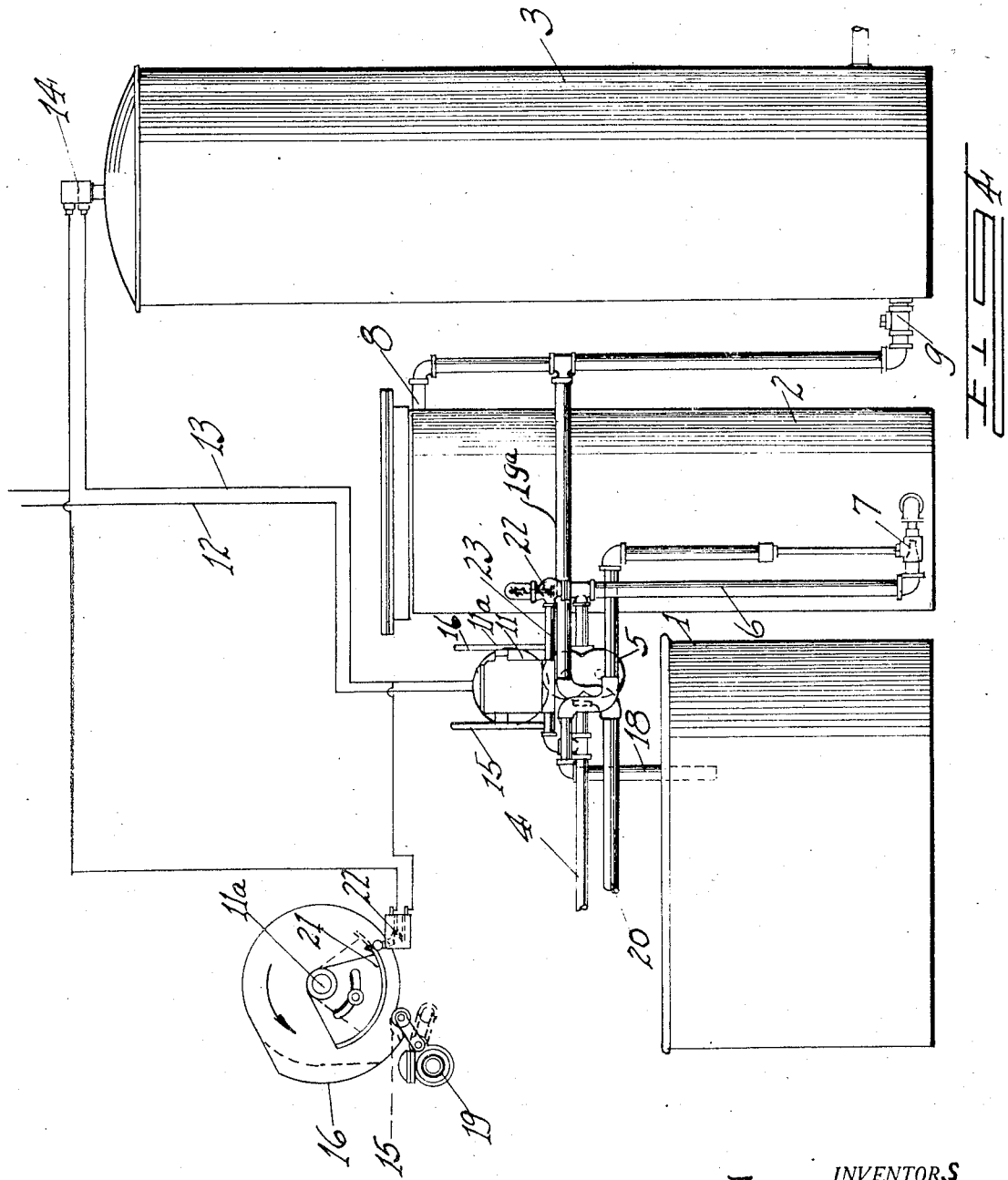

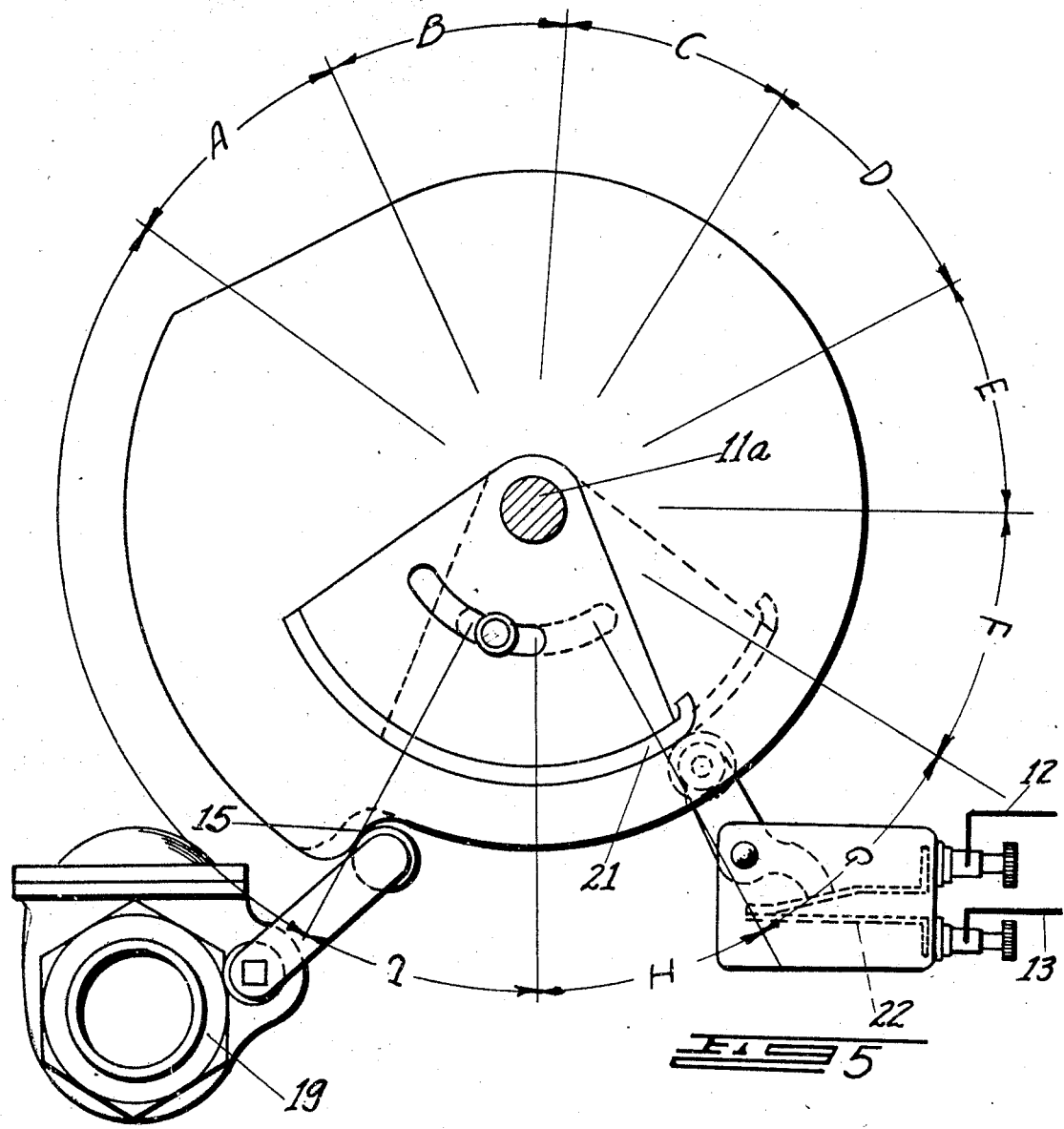

1,804,834

UNITED STATES PATENT OFFICE

FRANK X. LAUTERBUR, EDWARD J. LAUTERBUR, AND HOWARD L. MINTCHELL, OF SIDNEY, OHIO, ASSIGNORS TO THE PEERLESS BREAD MACHINE COMPANY, OF SIDNEY, OHIO, A CORPORATION OF OHIO

WATER SOFTENING APPARATUS AND METHOD OF AUTOMATICALLY CONTROLLING THE REGENERATING CYCLES IN A WATER SOFTENING SYSTEM

Application filed January 21, 1928. Serial No. 248,489.

Our invention relates to apparatus for softening water with base exchange silicates and other similar chemicals and to a novel method of controlling periodically the regeneration of the softening materials.

It is the object of our invention to provide apparatus including a pressure tank, for softening water, which will function automatically in cycles of softening regeneration and washing. It is specifically our object to control the cycles of operation by cycles of pressure induction in the pressure tank. It is our object to provide a softening tank to which hard water is supplied from a booster pump. The pump will preferably be electrically operated and it is our object to put a pressure controlled switch in connection with the pressure tank which will cause operation of the pump when the pressure reaches a low point and which will stop the pump when a desired high pressure point has been reached.

The system which we employ is quite similar to that which we have described in our co-pending application, Serial #244,736, filed January 5, 1928. We employ a brine tank preferably such as we have described in our co-pending application. We further employ a mineral and softening tank and in connection with it we use a water storage or pressure tank which for purposes of illustration we may consider to be an eighty gallon tank, although we could use a smaller or larger pressure tank in connection with the apparatus if conditions required it.

In our co-pending application we employ a meter which starts a time controlled device which in turn controls the re-conditioning cycles. In the present application we utilize a pressure tank and a water pump for an equivalent purpose. In our co-pending application we have shown an electrically driven motor with reduction gearing for operating cams which control the reconditioning periods and we now incorporate with this motor a water pump which will preferably be of the rotary type.

With this novel arrangement including a pump we have an automatic booster system which will insure an adequate pressure of water through the softening and in the service or house lines. Supposing an irregular pressure condition exists in a city or in a part of a city. With our system we could maintain a definite pre-determined pressure on the pressure tank which would avoid difficulties with irregular pressure. We place on the pressure tank a standard pressure switch having a high and low setting point, which, we may assume, for purposes of illustration to have a low pressure point of twenty-five pounds and a high pressure point of fifty pounds.

To our previously referred to electrically driven reconditioning unit, to which our pump is attached, we further attach cams which are adapted to control our herein described system. Instead of using the entire circumference of the cams for re-conditioning purposes, however, we use portions of the cams only.

We show modified types of water-softening systems all incorporating the general principal involved but some of which have improvements which will insure more positive operation.

The above and other objects to which reference will be made in the ensuing disclosure we accomplish by that certain combination and arrangement of parts of which we have shown several preferred modifications.

Referring to the drawings;

Figure 1 is a side elevation showing the simplest form of water softening system.

Figure 2 is a detailed view showing the cam controlled switch for starting the motor.

Figure 3 is a plan view of the cam detached from the part shown in Figure 2.

Figure 4 is a side elevation including a diagram of an approved cam control arrangement and wiring diagram which makes the system more positive in its operation.

Figure 5 is an enlarged view of the improved cam control for the cycles of operation.

Figure 6:
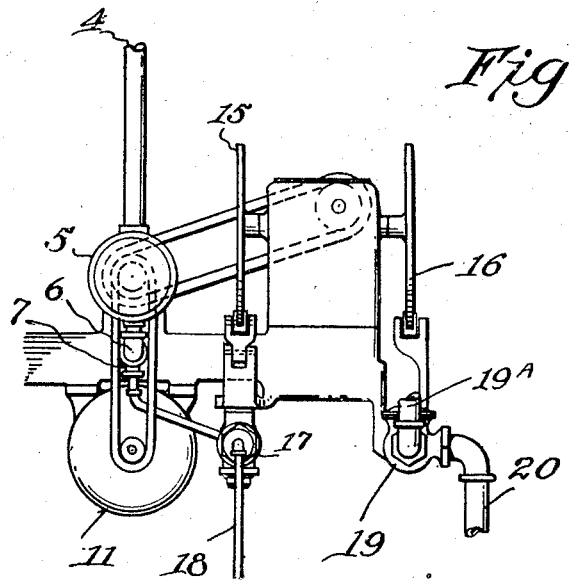
Fig. 6 is an enlarged view of the pipe connected with the control mechanism as indicated in Fig. 1, the tanks and other portions of the apparatus being omitted.

Referring first to the different elements of the system shown in both Figures 1 and 4 we have shown the brine tank 1, a tank 2 for regenerating material and a pressure tank 3 for softened water. The service supply lines to the system is indicated at 4 and an electrically driven rotary pump 5 pumps water from the supply pipe through a pipe 6 into an injector 7, thence into the tank 2 which contains the softening compounds. Discharging from the tank 2 we have shown the discharge line 8 which discharges through a check valve 9 into the pressure tank 3. We have shown in Figure 1 the preferred type of pressure tank with an air chamber at the top which will allow for fluctuating air pressure within the tank between the limits set on the pressure controlled switch. The discharge pipe from the pressure tank to the house or service lines is indicated at 10. This feature is not illustrated in Figure 4 as it forms no part of the invention.

The motor which operates the water pump and regenerating valve control cams is indicated at 11 having power feed electric lines 12, 13. One of the lines passes to the limit switch 14 which is set in the tank 3 and automatically closes the switch at a high pressure point and opens it at a low point. On a shaft 11a driven with suitable reduction gearing from the motor the cams 15 and 16 are mounted. The cam 15 controls the regenerating period during which the valve 17 to the brine tank is opened. During the regenerating period brine is drawn in through the suction pipe 18 from the brine tank and passes in through the pipe 6 into the softening tank. The drain valve 19 during this period is also held open by the cam 16 so that the liquor from the top of the softening tank flows through pipe 8 and branch pipe 19a to valve 19 and thence to the drain through the pipe 20. The preferred assembly of piping valves etc., is illustrated in our application Serial No. 244,736, filed January 5, 1928.

As illustrated in our aforenoted co-pending application the cam which holds the drain valve open has a larger bearing surface than the cam which holds open the brine tank so that after the brine valve is closed, unsoftened water will continue to pass through the softening tank and out through the drain line, thereby allowing a suitable period of washing out after the regenerating cycle is completed.

The system illustrated in Figure 4 has all the elements of the system shown in Figure 1 with a cam 21, preferably adjustably mounted on one of the cams 15 or 16. A switch 22 normally held open by a spring is mounted in series with the cut-in switch 14 in the line 13. This switch is adapted to be closed by the adjustable cam or segment 21 substantially one period before the brine valve is opened for a purpose which will be hereinafter described. Further Figure 4 shows a relief valve 22a which is in a pipe 23 which runs from the discharge side 6 of the pump back around to the intake side 4.

The operation of the system is as follows: Referring first to Figures 1–3, after a certain number of pumping cycles which carry the cams periodically to the position indicated in Figure 5 by the letters A to J, the motor rotates to such a position that the waste and brine valves are opened by the cams 15 and 16. Suppose that it requires an introduction of 27 gallons of water into the tank to bring up the pressure from the low point at which we have the switch set to the high point at which we have set it. For the purpose of illustration, we may assume the low point at 25 and the high point at 50.

If the pump is geared to throw 9 gallons per minute and 27 gallons is required to bring up the pressure, it follows that the motor mechanism will operate 3 minutes and then cut itself out. During this 3 minutes the cam would progress from the point marked A to the point marked B. No valve action whatever will occur. The inlet water line will be open to the mineral tank. The line from the mineral tank to the pressure tank will also be open. We will, therefore, force our water through our mineral bed and into our pressure tank.

If the exact same operation continued to occur and 27 gallons were introduced into the pressure tank each time the motor is started, we will progress around to the points C, D, E, F, G, H, I and J at each successive motor start. Approximately 243 gallons of soft water will be provided before a regeneration cycle is induced. The cam will eventually travel around so that when we reached the point indicated at J, the cam will be in a position as illustrated by the dotted section. When the position is reached and the motor is started, we will pass through our cycle of reconditioning, which on the particular cams illustrated we have shown as a 3 minute brine intake, a 7 minute wash, or a total of a 10 minute period. Thus without measuring the water by a meter we can accurately calculate the periods of softening and regeneration.

In the system shown in Figure 1 there is one possibility of unsatisfactory operation if the reconditioning section of our cam were to be reached at the time the pressure was low, we would have the minimum pressure on the storage tank instead of the maximum pressure at the time our unit started to recondition the material in our softening tank, although it would be desirable that the reverse be the case. It is desirable that we have maximum pressure in our pressure tank when the reconditioning operation begins so that normal requirements for soft water may be taken care of.

In order to reduce the likelihood of inaccuracy from this source to a minimum we have provided an electrical contact to be engaged by our controlling cam a short interval before the reconditioning position of the electrical switch, so that continuous operation of the motor is insured. In our Figure 3, we have drawn the central cam relatively large though it is the same cam mechanism which is shown in Figure 2.

Figure 7:
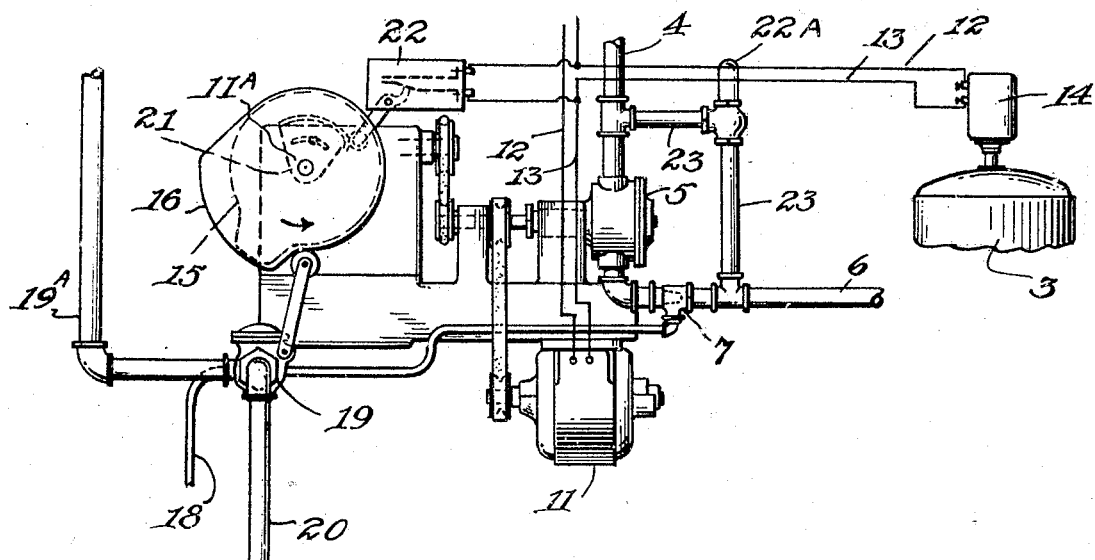
Fig. 7 is an enlarged view of the pipe connected with the control mechanism indicated in Fig. 4, the tanks and other portions of the apparatus being omitted.

In the improved structure shown in Figures 4–7, continuous operation would carry the motor past the point at which the pressure contactor would ordinarily stop the motor and excessive pressure would be built up in the pressure tank. By placing a by-pass around our pump mechanism and placing a relief valve in the feed line this tendency is avoided. We set this valve at a slightly higher pressure than the high pressure on the storage tank, so that when pressure above the ordinary storage tank pressure is built up, the relief valve operates and even though the water pump continues to function, the water will pass back into the hard water supply line.

On the cam we have indicated nine reconditioning periods. The same number of reconditioning periods are indicated on both assembly drawings. The cam is shown having nine reconditioning spaces, which we may assume to be approximately 3 minutes each. This is an arbitrary length of time because we assume, on the size outfit illustrated that a pump throwing about nine gallons a minute is used and that approximately 27 gallons of water would build up our pressure from 33 pounds low to 60 pounds high, though 33 and 60 are just arbitrary figures and might just as well be 25 and 40 pounds.

We have indicated an electrical switch and the cam which makes contact with the switch. The cam may be placed permanently and it should be of such length that it will hold the switch open for one reconditioning period, that is, so that it will operate at least one complete period and usually part of the next period so that the stopping of the motor without having the maximum pressure in the tank is forestalled. If the cam was not set to reach over the renewal of pressure period it might stop at the period just ahead of the point at which the reconditioning would begin.

Without this cam if the pressure is lowered in the pressure tank to the low point, by the withdrawal of softened water the pressure switch would make contact, the motor would start, and we would begin to pump up pressure in the tank. After operation had continued for perhaps one minute a point on the cam where the reconditioning process would begin might be reached and the cam would open the waste line which would prevent any further pressure being built up in the pressure tank until the reconditioning period was completed. Without the auxiliary cam if reconditioning was started at 33 pounds, for example, and the cam was of such size as to run 3 minutes and to pump 27 gallons and raise the pressure to 60 pounds in the pressure tank, after operating 1 minute and pumping 9 gallons the reconditioning point on the cam might be reached, the waste line valve would be opened and it would follow that no more pressure in the pressure tank could be built up until the reconditioning process was completed. What we would actually want would be our maximum pressure, whatever that was set at, and for the purpose of discussion we have indicated 60 pounds. That is why we prefer to designate the cam as adjustable so that some people who might be willing to have their pressure fluctuate a great deal, say from 20 to 65 pounds, might desire longer running so that their motor would not operate as frequently. Instead of having the theoretical 9 running periods around the cam of 3 minutes each, we might easily have periods of twice that length. We would then set our adjustable cam further forward to assure its completely passing over one reconditioning period.

Since the section of the cam which extends back, as indicated, extends back of the point at which the waste valve opens, there is no likelihood of incomplete regeneration and the unique adjustable feature makes it easy to set the cam regardless of the periods required for building up pressure.

The auxiliary section on the cam, or that section which comes in contact with the electrical switch so that the contact can be established so that the pressure regulator cannot stop the motor when it is so near the reconditioning period that we will not be assured of sufficient length of operation to build up the pressure in the tank. The motor will continue to operate and excessive pressure would be built up in the tank were it not for the by-pass around the pump through which the water can travel after it has forced its way through the relief valve. The relief valve should be set for a somewhat greater pressure than the high pressure in the pressure tank. When that section of the cam in which the reconditioning has taken place is passed we will have passed that point on our auxiliary cam which maintains the electrical contact and when we reach the end of the reconditioning period we have high pressure in the tank and the pressure valve will cut out the motor. If during the reconditioning period, water should be drawn from the pressure tank, the operation of the motor will continue, the mechanism will continue to operate over the plain period of the cam and the pressure in the pressure tank will be built up to the high point.

Having thus described our invention what we claim as new and desire to secure by Letters Patent is:

1. Water softening apparatus comprising a tank for softening material, a tank for regenerating material, and a pressure tank for soft water, means for replenishing the supply of soft water in said pressure tank periodically in accordance with variations in pressure in said pressure tank, and means for controlling cycles of regeneration by said periodically softening means.

2. Water softening apparatus comprising a tank for softening material, a tank for regenerating material, and a pressure tank for soft water, means for replenishing the supply of soft water in said pressure tank periodically in accordance with variations in pressure in said pressure tank, and means for controlling cycles of regeneration by said periodically softening means and means for insuring a complete cycle of regeneration operation.

3. A method of controlling cycles of regeneration in a water softening system which consists in providing a storage supply for soft water which is subject to variations in pressure with the withdrawal of soft water therefrom, periodically replenishing the supply of soft water in a predetermined degree of pressure in said storage supply subsequent to the withdrawal therefrom of soft water, and controlling cycles of regeneration after a predetermined series of periodic replenishing operations.

4. A water softening system having a tank for softening material, a tank for regenerating material, and a pressure tank for soft water, with a booster pump for pumping water through said first named tank into said last named tank, means for controlling the pressure within said last named tank within predetermined limits, said means operatively connected with said booster pump, and means operatively connected to said first named means for periodically inducing a period of regeneration within said first named tank.

5. A water softening system having a tank for softening material, a tank for regenerating material, and a pressure tank for soft water, with a booster pump for pumping water through said first named tank into said last named tank, means for controlling the pressure within said last named tank within predetermined limits, said means operatively connected with said booster pump, and means operatively connected to said first named means for periodically inducing a period of regeneration within said first named tank, said first named means comprising a high and low pressure switch actuative by the pressure within said pressure tank, and an electric motor connected to said pump.

6. A water softening system having a tank for softening material, a tank for regenerating material, and a pressure tank for soft water, with a booster pump for pumping water through said first named tank into said last named tank, means for controlling the pressure within said last named tank within predetermined limits, said means operatively connected with said booster pump, and means operatively connected to said first named means for periodically inducing a period of regeneration within said first named tank, said first named means comprising a high and low pressure switch actuative by the pressure within said pressure tank, and an electric motor connected to said pump, and said second named means comprising a suction valve to said regenerating material tank, and a valve from said softening tank to a drain, with means for opening said valves, said means operatively connected with said motor.

7. In combination with water softening apparatus including a tank for softening material, a brine tank and a pressure tank for soft water, a cut-off switch connected with the tank for soft water, said switch adapted to be set for high and low limits, a booster pump, and a motor for operating said pump, said motor having electric lines for completing the circuit thereto, with said switch in one of said lines.

8. In combination with water softening apparatus including a tank for softening material, a brine tank and a pressure tank for soft water, a cut-off switch connected with the tank for soft water, said switch adapted to be set for high and low limits, a booster pump, and a motor for operating said pump, said motor having electric lines for completing the circuit thereto, with said switch in one of said lines and means for controlling periods of regeneration also operatively connected with said switch.

9. In combination with water softening apparatus comprising a tank for softening material, a tank for regenerating material and a tank for soft water under pressure, means for controlling cycles of softening, washing and regeneration, said means controlled by the pressure of the water within the soft water tank.

10. In combination with water softening apparatus comprising a tank for softening material, a tank for regenerating material and a tank for soft water under pressure, means for controlling cycles of softening, washing and regeneration, said means controlled by the pressure of the water within the soft water tank and the cycle of regeneration being induced after a series of softening operations.

11. Water softening apparatus including a soft water pressure tank, with a booster pump for periodically raising the pressure in said pressure tank at intervals depending on the quantity of soft water withdrawn therefrom, and means for controlling a cycle of regeneration after a series of pressure raising pumping operations.

12. Water softening apparatus including a soft water pressure tank, with a booster pump for periodically raising the pressure in said pressure tank at intervals depending on the quantity of soft water withdrawn therefrom, and means for controlling a cycle of regeneration after a series of pressure raising pumping operations, with auxiliary means to insure that complete cycles of regeneration will be accomplished regardless of what interval in the pressure raising period the regeneration cycle is induced.

13. Water softening apparatus comprising a tank for regenerating material, a tank for softening material and a pressure tank for soft water, a booster pump having an electric motor drive for introducing hard water into the tank for softening material, said pump having a control for setting the pump into operation upon a certain drop in pressure in said pressure tank and for stopping said pump after a certain pressure has been built up, and means for controlling cycles of regeneration after a certain number of pumping operations.

14. Water softening apparatus comprising a tank for regenerating material, a tank for softening material and a pressure tank for soft water, a booster pump having an electric motor drive for introducing hard water into the tank for softening material, said pump having a control for setting the pump into operation upon a certain drop in pressure in said pressure tank and for stopping said pump after a certain pressure has been built up, and means for controlling cycles of regeneration after a certain number of pumping operations, said means comprising means connected with the electric motor drive for said pump.

15. In a water softening system having a tank for regenerating material, a tank for softening material, a pressure tank and a pump for intermittently pumping hard water through the softener tank into the pressure tank, means for inducing a regenerating cycle arranged to operate after a definite number of pumping operations.

16. In a water softening system having a tank for regenerating material, a tank for softening material, a pressure tank and a pump for intermittently pumping hard water through the softener tank into the pressure tank, means for inducing a regenerating cycle arranged to operate after a definite number of pumping operations, said means comprising an electric motor which drives the pump, and cams connected to the electric motor with valves on the brine tank and on a waste line to the drain the opening of which by the cams will induce the regenerating cycle.

FRANK X. LAUTERBUR.
EDWARD J. LAUTERBUR.
HOWARD L. MINTCHELL.